US008701537B2

(12) United States Patent
Baernthaler et al.

(10) Patent No.: US 8,701,537 B2
(45) Date of Patent: Apr. 22, 2014

(54) CUTTING TOOL WITH DETACHABLY CONNECTED INSERTS

(75) Inventors: Walter Baernthaler, St. Marein im Muerztal (AT); Armin Schlemmer, Oberaich (AT); Johann Winter, Kirchdorf (AT)

(73) Assignees: Boehlerit GmbH & Co. KG., Kapfenberg (AT); Maschinenfabrik Liezen und Giesserei Ges.m.b.H, Liezen (AT)

( * ) Notice: Subject to any disclaimer, the term of this patent is extended or adjusted under 35 U.S.C. 154(b) by 329 days.

(21) Appl. No.: 12/126,533

(22) Filed: May 23, 2008

(65) Prior Publication Data
US 2009/0000454 A1 Jan. 1, 2009

(30) Foreign Application Priority Data

May 24, 2007 (AT) .................................. A 826/2007

(51) Int. Cl.
B27B 33/12 (2006.01)
(52) U.S. Cl.
USPC ............................................... 83/843; 83/839
(58) Field of Classification Search
USPC ........... 83/839–845; 407/47–50, 100–112, 93
See application file for complete search history.

(56) References Cited

U.S. PATENT DOCUMENTS

| 141,122 | A | * | 7/1873 | Crookes ........................... 125/22 |
| 1,148,374 | A | * | 7/1915 | Freas ............................. 407/102 |
| 4,357,123 | A | * | 11/1982 | Zweekly ....................... 407/110 |
| 4,363,576 | A | * | 12/1982 | Zweekly ......................... 407/50 |
| 4,580,930 | A |  | 4/1986 | Zinner |
| 5,085,541 | A | * | 2/1992 | Simpson, III ................. 407/110 |
| 5,207,537 | A | * | 5/1993 | Englund ........................ 407/110 |
| 5,360,298 | A | * | 11/1994 | Hedlund ........................ 407/110 |
| 5,411,354 | A | * | 5/1995 | Gustafsson ................... 407/110 |
| 5,516,241 | A | * | 5/1996 | Plutschuck et al. ........... 407/110 |
| D381,028 | S | * | 7/1997 | Mihic ........................... D15/139 |
| 5,795,109 | A | * | 8/1998 | Jonsson et al. .................. 407/72 |
| 5,820,309 | A | * | 10/1998 | Mihic ............................. 407/50 |
| 5,827,017 | A | * | 10/1998 | Tagstrom et al. ............. 407/116 |
| 5,934,843 | A | * | 8/1999 | Brask et al. ................... 407/106 |
| 6,116,823 | A | * | 9/2000 | Mihic .............................. 407/40 |
| 6,241,429 | B1 | * | 6/2001 | Schafer et al. ................ 407/110 |
| 7,264,424 | B2 | * | 9/2007 | Hansson et al. .............. 407/109 |

FOREIGN PATENT DOCUMENTS

| CH | 685 680 | 9/1995 |
| CH | 688 794 | 3/1998 |
| DE | 33 01 919 | 7/1984 |

(Continued)

OTHER PUBLICATIONS

Grigoryants et al., "Technolgical processes of laser treatment", M., N.E.Bauman MGTU publishing house, 2006.

(Continued)

Primary Examiner — Kenneth E. Peterson
Assistant Examiner — Jennifer Swinney
(74) Attorney, Agent, or Firm — Greenblum & Bernstein, P.L.C.

(57) ABSTRACT

A cutting tool that includes a base body including at least one deformable clamping element and at least one bit seat in which an insert is positionable, and at least one control element positioned in a recess of the base body. The at least one control element is positionable to bias the at least one deformable clamping element against the insert to hold the insert in the at least one bit seat.

22 Claims, 4 Drawing Sheets

(56) References Cited

FOREIGN PATENT DOCUMENTS

| | | | |
|---|---|---|---|
| DE | 3301919 A1 * | 7/1984 | .............. B23B 27/16 |
| DE | 42 36 370 | 5/1994 | |
| DE | 196 23 081 | 1/1998 | |
| DE | 100 42 402 | 5/2001 | |
| EP | 0 095 062 | 11/1983 | |
| SU | 1140897 | 2/1985 | |
| SU | 1181780 | 9/1985 | |
| SU | 1410790 | 12/1990 | |
| WO | WO93/08945 | 5/1993 | |

OTHER PUBLICATIONS

Russia Office action that issued with respect to related Russian Patent Application No. 2008120695/02, dated Aug. 5, 2011 along with a partial English-language translation thereof.

* cited by examiner

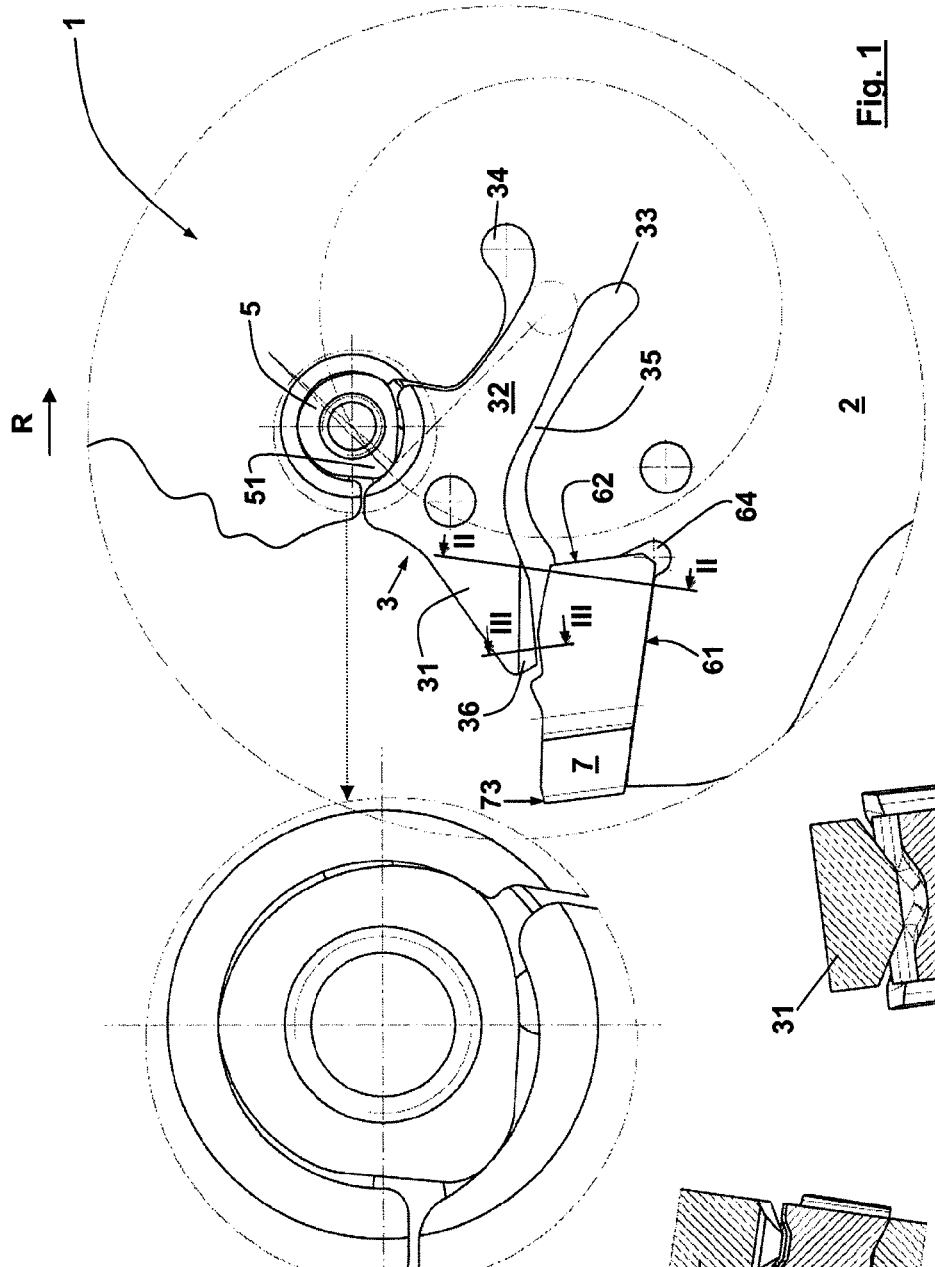

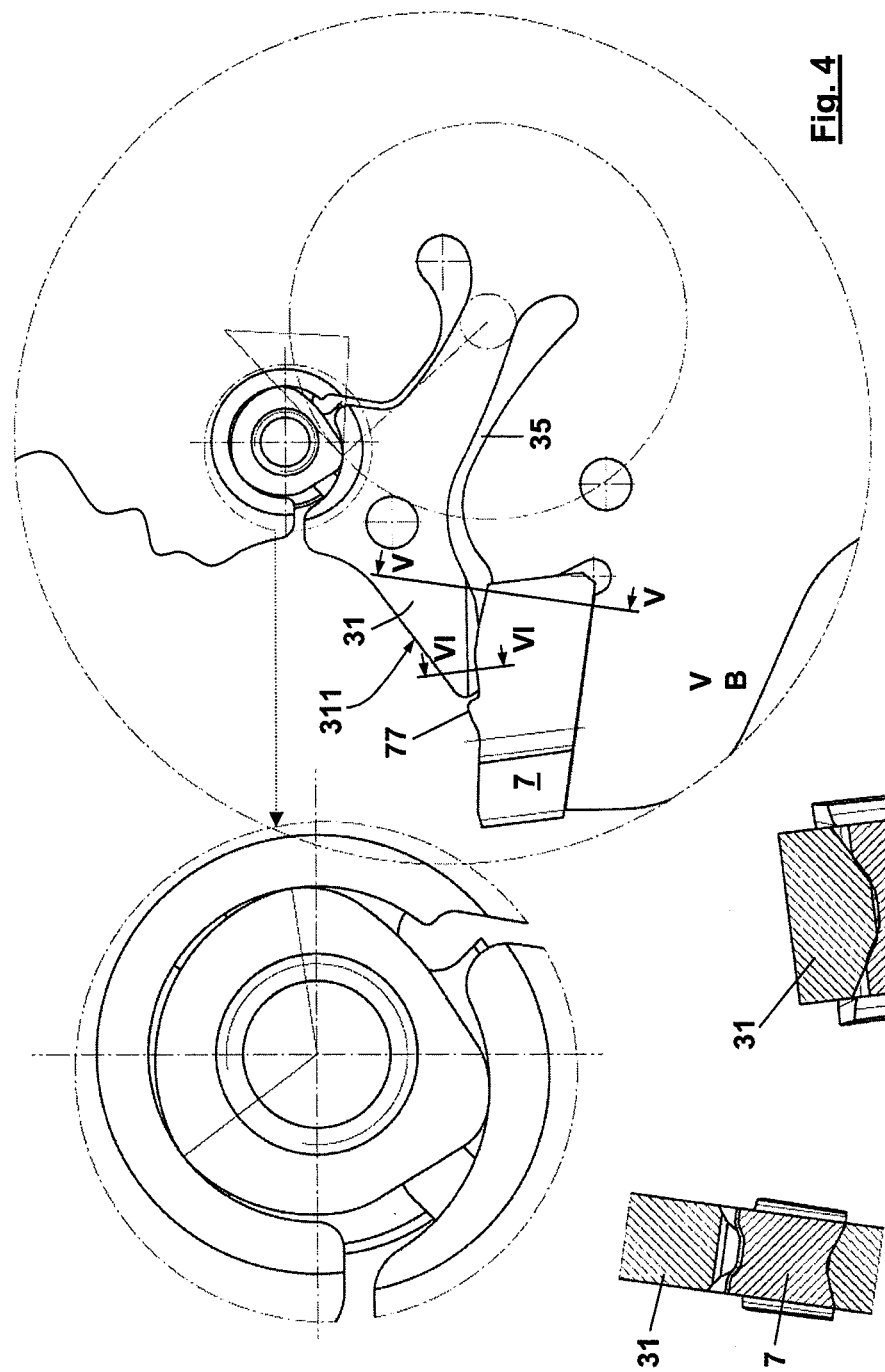

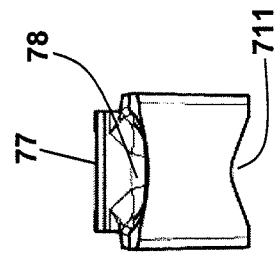
Fig. 9
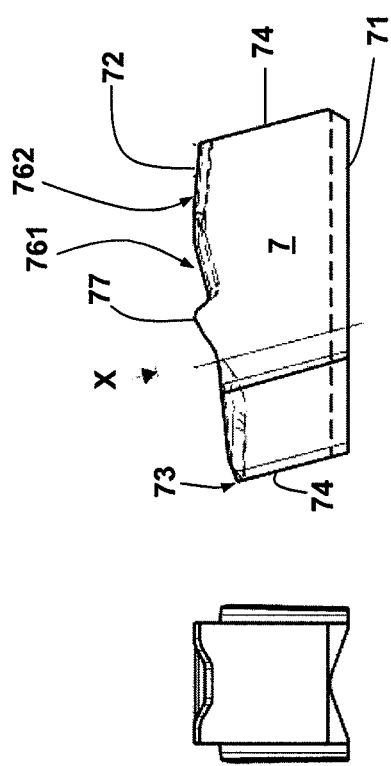
Fig. 7
Fig. 8
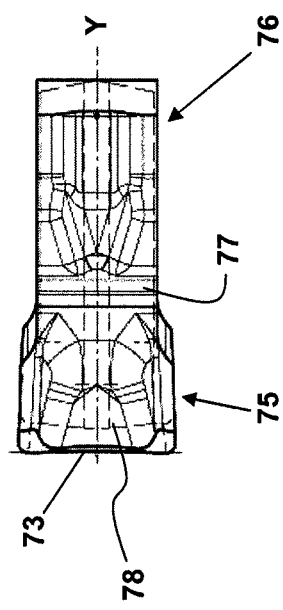
Fig. 10

CUTTING TOOL WITH DETACHABLY CONNECTED INSERTS

CROSS-REFERENCE TO RELATED APPLICATIONS

The present application claims priority under 35 U.S.C. §119 of Austrian Patent Application No. 826/2007, filed May 24, 2007, the disclosure of which is hereby expressly incorporated by reference herein in its entirety.

BACKGROUND OF THE INVENTION

1. Field of the Invention

The invention relates to a cutting tool with a base body that has at least one bit seat in which an insert is held.

2. Discussion of Background Information

With cutting tools of this type, it is desirable on the one hand to fix inserts in the bit seat as firmly as possible in order to avoid a detachment of inserts during use. On the other hand, particularly with cutting tools that have a plurality of bit seats and accordingly are equipped with many inserts, a detachable fixing of the inserts is desirable so that individual inserts can be replaced as soon as they are worn.

Inserts can be attached to the base body of a cutting tool in various, as described herein for saw blades by way of example.

For example, in the case of saw blades that are embodied with bit seats distributed on the circumference of a base body, in which bit seats inserts are held, which inserts cause a chip removal on the processed workpiece upon rotation of the saw blade, the individual inserts are attached to the base body by soldering. However, this has the result that only a single cutting geometry can be used. Namely, as soon as the inserts are connected by soldering to the base body, a cutting geometry can no longer be changed. Furthermore, another result associated with soldering is that a resharpening must always be carried out on-site. A detachment of individual inserts and an individual, professional resharpening by the insert manufacturer are not possible. The entire saw blade must also be replaced when only a part of the inserts has become unusable.

Another method is to attach the individual inserts to the base body by screws. Apart from the fact that a fastening hole has to be provided for this purpose in each insert, which impairs a stability of the insert in the bit seat, this method can be used only for inserts that have a certain minimum size. In the case of small inserts, such as are used for small cutting widths, a screw fastening is not possible.

Another method is to clamp the individual inserts into yielding, V-shaped bit seats of the base body (so-called self-grip systems). In this case a particularly precise manufacture of the bit seats is necessary with extremely low tolerances. This entails a high labor expenditure in the production of the base body. In addition, a further result is that an undesirable detachment of the inserts or cutting teeth may occur with extreme loads.

A similar method to that described above is to place inserts into a V-shaped bit seat of a base body and to fix them there with wedge-shaped pins. However, a particularly exact production of the bit seats is also necessary in this case. Furthermore, the inserts must be provided with recesses for the pins, which weakens the inserts.

SUMMARY OF THE INVENTION

The invention relates to a cutting tool to which one or more inserts can be detachably fixed in a simple manner and with high force.

According to aspects of the invention, a cutting tool has a base body that has at least one elastically deformable clamping element. The clamping element can be placed against the insert with the aid of a control element positioned in a recess of the base body in order to hold the insert in the bit seat.

In implementations of a cutting tool according to aspects of the invention, the inserts provided can be detachably fixed to the base body in a simple manner with extremely high force. It is therefore possible, for example, to detachably mount inserts to saw blades with a diameter of more than 2.5 meters without having to fear a detachment of individual inserts from the bit seats during cutting or sawing. At the same time, embodiments provide clamping elements with control elements that are respectively shaped or positioned in the base body to realize even very small cutting widths. For example, saw blades of any desired thinness can be used since the elements provided for the attachment of an insert can be provided regardless of a thickness of the saw blade.

In contrast to other known solutions, in particular self-grip systems, the bit seats of a cutting tool in accordance with aspects of the invention can be produced with relatively large tolerances. Namely, while with self-grip systems the bit seats must be produced exactly to a hundredth of a millimeter so that an insert can be fixed by clamping, substantially greater tolerances can be provided with a cutting tool (e.g., a saw blade) according to aspects of the invention. This is because inaccuracies of production can be easily surmounted with the application of the clamping elements in implementations of the invention. A much lower preparation or production expenditure for the base body is therefore provided by embodiments of the invention.

The attachment system provided according to aspects of the invention has proven valuable in particular when several bit seats are provided in which respectively one insert is held by respectively one clamping element and a control element interacting therewith. In this manner, individual inserts can then easily be replaced in the case of cutting tools with a plurality of inserts.

The at least one clamping element may be embodied as an integral part of the base body or may represent an elastically deformable area thereof.

In implementations, the base body is embodied as a whole in one part, which provides a simple production as well as a high stability of the cutting tool in use. The base body may be made of steel, in particular a steel with high toughness.

The elastically deformable clamping element(s) provided can be shaped in the base body in different ways, for example, through water-jet cutting or wire spark eroding. In embodiments, the clamping elements are cut into the base body by a laser. The bit seats can also be cut into the base body at the same time.

The shaped clamping element(s) can be embodied such that they have a nose that can be placed against an insert. In embodiments, an arm connects to the nose at an angle and is tapered towards the center of the base body.

According to aspects of the invention, the clamping elements can be placed against the inserts with relatively low force by activation of the control elements. The at least one clamping element may be connected to the control element at the transition from the nose to the arm. Upon activation or fixing of an insert, the control element then presses on a nose, through which the clamping element is deformed at its weakest point, namely at the end of the arm opposite the transition. A force necessary for fixing the insert is minimized due to the tapered embodiment of the opposite end and a lever effect.

In accordance with aspects of the invention, the control element(s) provided in recesses of the base body can be realized in various ways, using any elements that permit a clamping element to be pressed onto an insert upon activation. In a particular embodiment, a control element of this type can comprise only a screw. In another embodiment, the control element comprises a partially approximately circular, rotatable body that bears in two edge areas of the recess and against the clamping element. A 3-point contact or a 3-point seat is thus created for the rotatable body, due to which the body is held in the recess safe from tipping regardless of its position. At the same time, a contact surface between the body and other parts of the cutting tool is small, which is why the body can be rotated with low force if required. For example, it is possible that the rotatable body comprises a cam bearing against the clamping element so that the at least one clamping element can be brought from an open position into a position fixing the insert and vice versa by rotating the body. In this manner, when used with a saw blade, each control element to be activated is easily accessible at the side of the saw blade. Moreover, the control element is virtually wedged through the cam provided between the clamping element and areas of the recess of the base body in which it sits, which leads to a particularly firm locking when the insert is fixed. Alternatively, it is also possible for the rotatable body to comprise an indentation bearing against the clamping element. In embodiments, the indentation bears against a protrusion of the clamping element so that the at least one clamping element can be brought from an open position into a position fixing the insert and vice versa by rotating the body.

In embodiments, to provide the firmest possible fixing of the insert, a bit seat or an insert is arranged approximately perpendicular to a rotational direction of the cutting tool. Also, the at least one clamping element can be placed against the insert in the opposite direction to the rotational direction. High forces occurring during cutting can thus be effectively counteracted.

In additional embodiments, for highest cutting capacities and cutting tools with large dimensions, for example, saw blades with a diameter of up to four meters, the bit seats may be embodied with projections running in the radial direction of the base body. Also, the inserts may have corresponding indentations in their base areas. Axial forces occurring during cutting can thus be counteracted.

An insert can be provided for a cutting tool (e.g., saw blade) according to aspects of the invention where the insert has an active cutting area on its top surface. In embodiments, the top surface has the cutting edge at one end and an attachment area at an opposite end. In further embodiments, a rib may be provided between the active cutting area and the attachment, which rib is raised with respect to the adjacent areas of the active cutting area and the attachment area. By providing a raised rib between the active cutting area and the attachment area, a separation of the areas is achieved so that the attachment area is protected during cutting from hot chips being discharged. Moreover, a clamping element of the base body can come to rest on the rib, whereby a retention of the insert in a bit seat is improved.

In embodiments, the insert comprises a chip trough that adjoins the cutting edge and merges into the rib. In this manner, removed chips can be guided away.

According to aspects of the invention, in order to achieve a good fixing of the insert in a bit seat by a clamping element, the attachment area has a first zone adjoining the rib and rising in cross section and a second zone adjoining the first zone and sloping downward in cross section. This prevents an insert from moving in the radial direction during cutting or with acting cutting forces.

According to additional aspects of the invention, in order that a good positive closure can be achieved with a clamping element, troughs are formed in the first and/or second zone. The troughs may run symmetrically to a longitudinal axis of the insert.

An insert used according to aspects of the invention can furthermore be embodied in plan view in an elongated manner and with an active cutting area that is widened compared to the attachment area.

In embodiments, the rib runs perpendicular to the longitudinal axis of the insert so that a separation from the attachment area and active cutting area is given over the entire width of the insert.

In further embodiments, the insert has one or more indentations in the region of its base area, which indentations may run over an entire length and/or width of the base area. This makes it possible to achieve a positive closure in the region of the base area of the insert in interaction with a bit seat having corresponding projections, when the insert is attached to the saw blade.

In accordance with a first aspect of the invention, there is a cutting tool comprising a base body including at least one deformable clamping element and at least one bit seat in which an insert is positionable. The cutting tool also comprises at least one control element positioned in a recess of the base body. The at least one control element is positionable to bias the at least one deformable clamping element against the insert to hold the insert in the at least one bit seat.

In embodiments, the at least one bit seat comprises a plurality of bit seats, the at least one deformable clamping element comprises a plurality of deformable clamping elements, the at least one control element comprises a plurality of control elements, and a respective insert is held in each of the plurality of bit seats by one of the plurality of deformable clamping elements interacting with one of the plurality of control elements. The at least one deformable clamping element may be integral with the base body.

According to further aspects of the invention, the base body is embodied as a unitary piece. The base body may be made of steel, and the at least one deformable clamping element may be cut into the base body by a laser.

In embodiments, the at least one deformable clamping element comprises a nose that can be placed against the insert, and an arm adjoined to the nose at an angle. The arm may taper toward a center of the base body. The at least one deformable clamping element may contact the at least one control element at a transition from the nose to the arm.

In accordance with additional aspects, the at least one control element comprises a partially approximately circular rotatable body, the rotatable body bears against the recess at two areas, and the rotatable body bears against the at least one deformable clamping element. The rotatable body may comprise a cam bearing against the at least one deformable clamping element, and the at least one deformable clamping element may be moveable between a first position fixing the insert and a second position unfixing the insert by rotating the rotatable body. Alternatively, the rotatable body may comprise an indentation bearing against a protrusion of the at least one deformable clamping element, and the at least one deformable clamping element is moveable between a first position fixing the insert and a second position unfixing the insert by rotating the rotatable body.

In embodiments, one of the at least one bit seat and the insert is arranged approximately perpendicular to a rotational direction of the cutting tool, and the at least one deformable clamping element is moveable against the insert in a direction opposite the rotational direction. In embodiments, the at least one bit seat comprises a projection corresponding to an indentation in a base surface of the insert. The projection may run in a radial direction of the base body. In embodiments, the cutting tool is a saw blade.

In accordance with another aspect of the invention, there is a cutting tool comprising a base body including a deformable clamping element and at least one bit seat in which an insert is held. The cutting tool also includes a control element comprising a rotatable body positioned in a recess of the base body. The deformable clamping element comprises a nose that is selectively moveable into and out of contact with the insert via rotation of the rotatable body. The deformable clamping element comprises an arm connected to the nose and the base body, and tapering toward a center of the base body. The rotatable body is arranged in a 3-point seat.

In embodiments, the 3-point seat comprises first and second areas where the rotatable body contacts the recess, and a third area where the rotatable body contacts the deformable clamping element. A line from a center of the rotatable body to a center of the first area may be arranged at approximately 120° relative to a line from the center of the rotatable body to a center of the second area.

In accordance with another aspect of the invention, there is a method of inserting an insert in a cutting tool. The method comprises arranging the insert in a bit seat of a base body of the cutting tool, and rotating a rotatable body arranged in a 3-point seat in a recess of the base body to move a deformable clamping element into contact with the insert.

BRIEF DESCRIPTION OF THE DRAWINGS

Further features, advantages and effects of aspects of the invention are shown by the context of the specification and the following exemplary embodiments, based on which aspects of the invention are shown in still more detail. The drawings show:

FIG. 1 shows a partial area of a saw blade according to the invention with a clamping element in opened position;
FIG. 2 shows a section along the line II-II in FIG. 1;
FIG. 3 shows a section along the line III-III in FIG. 1;
FIG. 4 shows a partial area of a saw blade according to the invention with a clamping element in fixing position;
FIG. 5 shows a section along the line V-V in FIG. 4;
FIG. 6 shows a section along the line VI-VI in FIG. 4;
FIG. 7 shows a side view of an insert;
FIG. 8 shows a rear view of an insert;
FIG. 9 shows a front view of an insert;
FIG. 10 shows an insert in plan view.

DETAILED DESCRIPTION OF THE INVENTION

Figure 12:
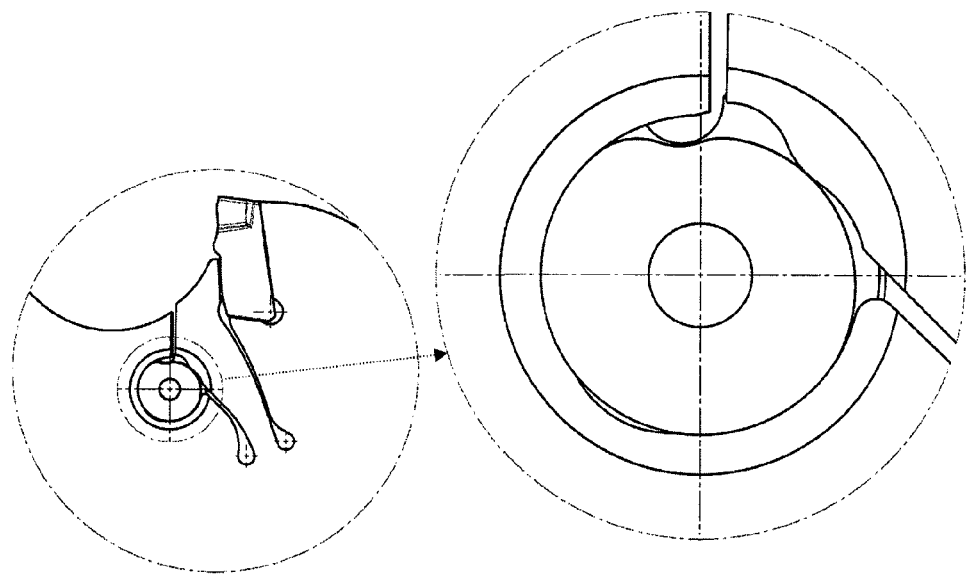
FIG. 12 shows a partial area of a saw blade according to the invention with a clamping element in fixing position.

FIG. 1 shows in more detail a partial area of a cutting tool according to aspects of the invention in the form of a saw blade 1. The approximately circular saw blade 1 comprises a base body 2 that is formed from an essentially planar circular flat material. A very tough steel is preferably used as the flat material, in which a bit seat with two areas 61, 62 as well as a gap 64 is cut by a laser. The gap 64 is provided so that the areas 61, 62 can be reworked by grinding.

In embodiments, the base body 2 has a shaped clamping element 3, which like the bit seat is cut into the base body 2 by a laser. The clamping element 3, seen from the center of the base body 2, has an arm 32, first embodied in a tapering manner and then widening approximately in the radial direction, on which arm a nose 31 is shaped at an angle of approximately 80° to 135°. In the area of its end directed to the center of the base body 2, the arm 32 is surrounded by two free spaces 33, 34, which together with the tapered embodiment at the one end ensure a good elastic deformability of the arm 32 in this area. Another free space 35 is provided beneath the arm 32 in order to make it possible to place the clamping element 3 against an insert 7. The insert 7 bears against the areas 61, 62 in a bit seat and the projecting cutting edge 73 of the insert 7 describes an outer orbit of the saw blade 1. In order to render possible this placement of the clamping element 3 in a simple manner, a control element 5 is held in a rotatable manner in a recess of the base body 2 likewise cut by a laser. In embodiments, the control element 5 is embodied in part in an approximately circular manner in plan view with a cam 51. On the one hand, the control element 5 in the approximately circular area bears against a non-deformable zone of the base body 2 at two points. On the other hand, as can be seen from FIG. 1 and the detailed view provided in this figure, the control element 5 bears against the clamping element 3 in the region of a transition from the nose 31 to the arm 32.

As depicted in FIG. 1, the cam 51 of the control element 5 is in a position in which the clamping element 3 is not depressed, but rather is opened and the insert 7 can be removed from the bit seat or inserted therein. This can be used, for example, when an individual insert 7 of a saw blade 1 is to be replaced, for example, because it needs to be ground or is worn and must be replaced. In this situation, a ground end area 36 of the nose 31 is spaced approximately 1 to 2 millimeters apart from the surface or top area 72 of the insert 7. If the eccentric or the control element 5 is now turned counter-clockwise, a pressure is exerted through the cam 51 onto the clamping element 3. Due to its flexibility, the clamping element 3 moves towards the insert 7 and fixes the insert ultimately with its force acting against a rotational direction R of the saw blade 1 (see, e.g., FIG. 4). The control element 5 with the cam 51 is thereby transferred into a locking position that causes a firm fixing of the insert 7. In embodiments, the control element 5 can be equipped with seats for a torque wrench so that a locking or fixing of the insert 7, as shown in FIG. 4, can take place with particularly low expenditure of force. Additionally, in order to achieve the desired locking with the lowest possible expenditure of force, and to render possible a continuously variable adjustment of a bearing pressure, an area of the clamping element 3 in contact with the cam 51 can be embodied in a concave manner, as shown in FIGS. 1 and 4.

In embodiments, as depicted in the sectional views of FIGS. 2, 3, 5 and 6 (not to scale), a bit seat with a projection 63 is provided, which projection 63 extends in the radial direction of the base body 2 over the entire length of the bit seat. The insert 7 has a corresponding indentation 711 (see, e.g., FIG. 9) so that not only a non-positive engagement but also a positive engagement is achieved in the region of a base surface 71 of the insert 7 (see, e.g., FIG. 7). Similarly, the clamping element 3 has ground projections in an end area 36 of the nose 31, which projections correspond in their geometry to corresponding troughs in the top surface 72 of the insert 7, into which troughs they engage. Overall, a highly effective non-positive engagement and positive engagement can be achieved in this manner, so that high radial forces as well as axial forces can be controlled during cutting.

An insert 7 used according to aspects of the invention is shown in more detail in FIGS. 7 through 10. As can be seen from FIG. 7, in embodiments, the insert 7 has a base surface 71 and a top surface 72 lying opposite, which are connected to one another via side surfaces 74. In the area of the top surface 72, the insert 7 at one end has a cutting edge 73 that provides a chip removal during use. The cutting edge 73 is adjoined by a chip trough 78 embodied in a deepened manner, on which removed chips glide off. This chip trough 78 merges directly into a rib 77 that is dimensioned in its shape and height such that it can form a virtually continuous surface with a back 311 of a nose 31 of a clamping element 3, which permits removed chips to flow off in an optimal manner. This can be important in particular when a formation of long chips is given due to the cutting conditions and/or the materials processed.

In embodiments, an attachment area with two zones 761, 762 is provided at the end of the insert 7 opposite the cutting edge 73, wherein a first zone 761 directly adjoins or merges into the rib 77. As can be seen in particular from FIG. 7 and FIG. 10, which shows an insert 7 pursuant to FIG. 7 seen in direction X, the zones 761, 762 are embodied with troughs that run symmetrically to a longitudinal axis Y of the insert 7. Corresponding projections of a clamping element 3 can engage in these troughs so that the insert 7 is secured against an axial displacement or slipping. In order to prevent a displacement of the insert 7 in the radial direction at the same time, in cross section the first zone 761 is embodied in a rising manner and the second zone 762 in a downwardly sloping manner. Furthermore, an indentation 711 can be provided in the area of the base surface 71 running along the longitudinal axis Y so that in a similar manner a positive closure can be achieved in the area of the base surface 71.

In implementations, due to the provided embodiment of the insert 7, the insert 7 can be fixed to a saw blade 1 according to aspects of the invention in a non-positive and positive manner. As can be seen from FIG. 10, this makes it possible to embody the active cutting area 75 in a wider manner than the attachment area 76, which provides the result that the saw blade 1 is always free-running during cutting.

Figure 11:
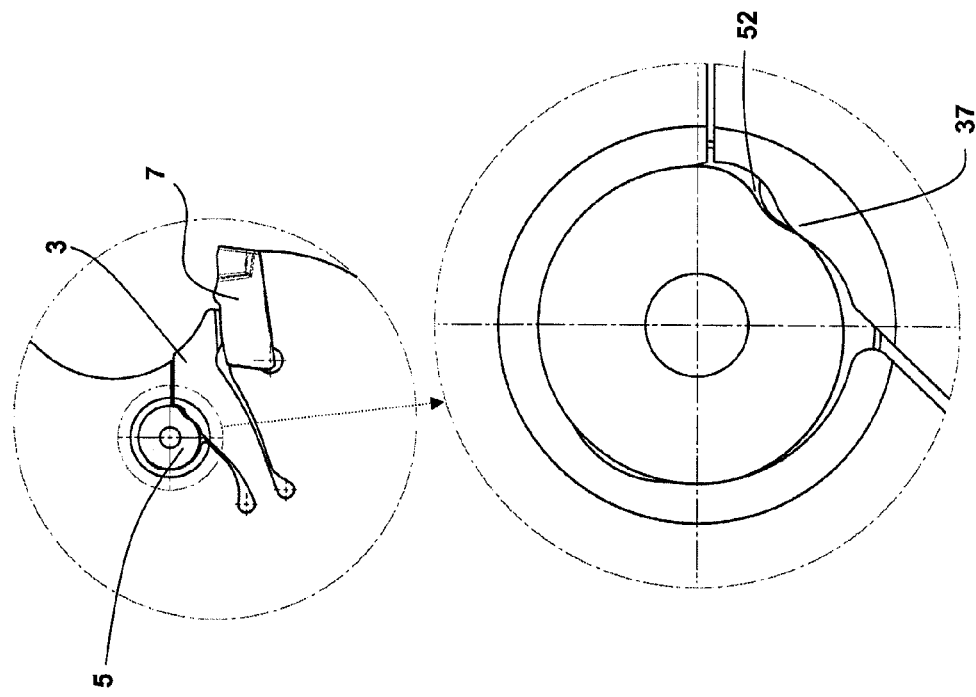
FIG. 11 shows a partial area of a saw blade according to the invention with a clamping element in opened position.

In FIGS. 11 and 12, partial areas of another variant of a saw blade 1 in accordance with aspects of the invention are shown in side view, wherein the partial areas comprise a single insert 7. The insert 7 sits loosely in the bit seat in the state depicted in FIG. 11. The control element 5, which is embodied as a rotatable body, has an indentation 52, as can be seen in particular from the detail view in FIG. 11. In embodiments, this indentation 52 interacts with a protrusion 37 of the clamping element 3 and is adapted in its shape approximately thereto. The rotatable body or the control element 5 is therefore in contact with the clamping element 3 in the area of the indentation 52. Furthermore, the control element 5 bears in two separate areas against the end of the recess in which it is located. In this manner, a 3-point contact or a 3-point seat is thus created for the rotatable body. This 3-point seat, in which the centers of the individual contact areas are arranged approximately at an angle of respectively 120° (e.g., as also depicted in FIGS. 1 and 4), leads to a high stability of the rotatable body when the insert 7 is fixed, which is shown in FIG. 12. The 3-point seat also has advantages during the fixing itself or during detachment, since a resistance during activation of the clamping element 3 or rotation of the body is low. Moreover, the rotatable body does not tend to jam, which could be given with a full-area seat and strong torsion of a saw blade during cutting.

Compared to the variant shown in FIGS. 1 through 4, additional advantages are evident in this embodiment with respect to the stability of the position of the rotatable body and the fixing of an insert 7 during cutting. Accordingly, that this variant is used in particular for applications with particularly demanding load profiles.

The invention claimed is:

1. A rotating saw blade cutting tool, comprising:
a base body including at least one deformable clamping element movable from an open position to a fixing position and at least one bit seat in which an insert is positionable;
at least one control element comprising a rotatable body; and
said rotatable body being positioned in a recess of the base body,
wherein the at least one control element is positionable to move the at least one deformable clamping element from the open position to the fixing position against the insert to hold the insert in the at least one bit seat in the fixing position, and
the rotatable body is structured and arranged in the recess so as to have three discrete contact areas comprising two contact areas that are provided between a wall of the recess and the rotatable body and a third contact area that is provided between the rotatable body and an inwardly or outwardly curved cam surface of the at least one deformable clamping element such that the three discrete contact areas are each located at different locations with respect to a radial line extending from a rotational axis of the rotatable body,
wherein the three contact areas are arranged in a common plane,
wherein, in both the open position and the fixing position, a distance between a center axis of the rotatable body and a first contactable portion of the inwardly or outwardly curved cam surface is different than a distance between the center axis of the rotatable body and a second contactable portion of the inwardly or outwardly curved cam surface, said first and second contactable portions being circumferentially spaced from each other, and
wherein the three contact areas between the rotatable body and the recess occur in both the open position and the fixing position.

2. The cutting tool of claim 1, wherein:
the at least one bit seat comprises a plurality of bit seats,
the at least one deformable clamping element comprises a plurality of deformable clamping elements,
the at least one control element comprises a plurality of control elements, and
a respective insert is held in each of the plurality of bit seats by one of the plurality of deformable clamping elements interacting with one of the plurality of control elements.

3. The cutting tool of claim 1, wherein the at least one deformable clamping element is integral with the base body.

4. The cutting tool of claim 1, wherein the base body is embodied as a unitary piece.

5. The cutting tool of claim 4, wherein the base body is made of steel.

6. The cutting tool of claim 5, wherein the at least one deformable clamping element is cut into the base body by a laser.

7. The cutting tool of claim 1, wherein the at least one deformable clamping element comprises:
a nose that can be placed against the insert; and
an arm adjoined to the nose at an angle.

8. The cutting tool of claim 7, wherein the arm tapers toward a center of the base body.

9. The cutting tool of claim 8, wherein the at least one deformable clamping element contacts the at least one control element at a transition from the nose to the arm.

10. The cutting tool of claim 1, wherein:
the at least one control element comprises a partially approximately circular rotatable body.

11. The cutting tool of claim 10, wherein:
the rotatable body comprises an indentation bearing against the outwardly curved cam surface of the at least one deformable clamping element.

12. The cutting tool of claim 1, wherein:
one of the at least one bit seat and the insert is arranged approximately perpendicular to a rotational direction of the cutting tool, and
the at least one deformable clamping element is moveable against the insert in a direction opposite the rotational direction.

13. The cutting tool of claim 1, wherein the at least one bit seat comprises a projection corresponding to an indentation in a base surface of the insert.

14. The cutting tool of claim 13, wherein the projection runs in a radial direction of the base body.

15. A rotating saw blade cutting tool, comprising:
a base body including a deformable clamping element movable from an open position to a fixing position and at least one bit seat in which an insert is held;
a control element comprising a rotatable body; and
said rotatable body being positioned in a recess of the base body,
wherein the deflectable clamping element comprises a nose that is selectively moveable from the open position into contact with the insert in the fixing position via rotation of the rotatable body,
the deflectable clamping element comprises an arm connected to the nose and the base body, and tapering toward a center of the base body, and
the rotatable body is structured and arranged in the recess so as to have three discrete contact areas comprising two contact areas that are provided between a wall of the recess and the rotatable body and a third contact area that is provided between the rotatable body and an inwardly or outwardly curved cam surface of the at least one deflectable clamping element such that the three discrete contact areas are each located at different locations with respect to a radial line extending from a rotational axis of the rotatable body,
wherein the three contact areas are arranged in a common plane,
wherein, in both the open position and the fixing position, a distance between a center axis of the rotatable body and a first contactable portion of the inwardly or outwardly curved cam surface is different than a distance between the center axis of the rotatable body and a second contactable portion of the inwardly or outwardly curved cam surface, said first and second contactable portions being circumferentially spaced from each other, and
wherein the three contact areas between the rotatable body and the recess occur in both the open position and the fixing position.

16. The cutting tool of claim 15, wherein a line from a center of the rotatable body to a center of the first contact area is arranged at approximately 120° relative to a line from the center of the rotatable body to a center of the second contact area.

17. A rotating saw blade cutting tool, comprising:
a base body including at least one deflectable clamping element movable from an open position to a fixing position and at least one bit seat in which an insert is positionable;
at least one control element comprising a rotatable body; and
said rotatable body being positioned in a recess of the base body,
wherein the at least one control element is positionable to bias the at least one deflectable clamping element from the open position to the fixing position against the insert to hold the insert in the at least one bit seat in the fixing position,
the rotatable body is structured and arranged in the recess so as to have three discrete contact areas comprising two contact areas that are provided between a wall of the recess and the rotatable body and a third contact area that is provided between the rotatable body and an inwardly or outwardly curved cam surface of the at least one deflectable clamping element such that the three discrete contact areas are respectively separated from one another when viewed parallel to a rotation axis of the rotatable body, and
wherein the three discrete contact areas are arranged in a common plane,
wherein, in both the open position and the fixing position, a distance between a center axis of the rotatable body and a first contactable portion of the inwardly or outwardly curved cam surface is different than a distance between the center axis of the rotatable body and a second contactable portion of the inwardly or outwardly curved cam surface, said first and second contactable portions being circumferentially spaced from each other, and
wherein the three contact areas between the rotatable body and the recess occur in both the open position and the fixing position.

18. A rotating saw blade cutting tool, comprising:
a base body including at least one deflectable clamping element movable from an open position to a fixing position and at least one bit seat in which an insert is positionable;
at least one control element comprising a rotatable body; and
said rotatable body being positioned in a recess of the base body,
wherein the at least one control element is positionable to bias the at least one deflectable clamping element from the open position to the fixing position against the insert to hold the insert in the at least one bit seat in the fixing position, and
the rotatable body is structured and arranged in the recess so as to have three contact areas with the recess such that the three contact areas are each located at different locations with respect to a radial line extending from a rotational axis of the rotatable body,
wherein the three contact areas are arranged in a common plane and one of the contact areas is provided between an inwardly or outwardly curved cam surface of the at least one deflectable clamping element and the rotatable body,
wherein, in both the open position and the fixing position, a distance between a center axis of the rotatable body and a first contactable portion of the inwardly or outwardly curved cam surface is different than a distance between the center axis of the rotatable body and a second contactable portion of the inwardly or outwardly curved cam surface, said first and second contactable portions being circumferentially spaced from each other, and wherein the three contact areas between the rotatable body and the recess occur in both the open position and the fixing position.

19. A rotating saw blade cutting tool, comprising:

a base body including a clamping element movable from an open position to a fixing position and at least one bit seat in which an insert is held;

a control element comprising a rotatable body; and said rotatable body being positioned in a recess of the base body, wherein the clamping element comprises a nose that is selectively moveable from the open position into contact with the insert in the fixing position via rotation of the rotatable body, the clamping element comprises an arm connected to the nose and the base body, and tapering toward a center of the base body, and the rotatable body is structured and arranged in the recess so as to have three contact areas with portions of the recess such that the three contact areas are each located at different locations with respect to a radial line extending from a rotational axis of the rotatable body, wherein the three contact areas are arranged in a common plane and one of the contact areas is provided between an inwardly or outwardly curved cam surface of the at least one clamping element and the rotatable body, wherein, in both the open position and the fixing position, a distance between a center axis of the rotatable body and a first contactable portion of the inwardly or outwardly curved cam surface is different than a distance between the center axis of the rotatable body and a second contactable portion of the inwardly or outwardly curved cam surface, said first and second contactable portions being circumferentially spaced from each other, and wherein the three contact areas between the rotatable body and the recess occur in both the open position and the fixing position.

20. A rotating saw blade, comprising:

a base body including at least one integrally formed clamping element movable from an open position to a fixing position and at least one bit seat in which an insert is positionable;

at least one control element comprising a rotatable body; and said rotatable body being positioned in a recess of the base body, wherein the at least one control element is positionable to move the at least one clamping element from the open position to the fixing position against the insert to hold the insert in the at least one bit seat in the fixing position, and the rotatable body is structured and arranged in the recess so as to have three contact areas with portions of the recess such that the three contact areas are each located at different locations with respect to a radial line extending from a rotational axis of the rotatable body, and wherein the three contact areas are located at outermost regions of the control element, wherein the three contact areas are arranged in a common plane and one of the contact areas is provided between an inwardly or outwardly curved cam surface of the at least one clamping element and the rotatable body, wherein, in both the open position and the fixing position, a distance between a center axis of the rotatable body and a first contactable portion of the inwardly or outwardly curved cam surface is different than a distance between the center axis of the rotatable body and a second contactable portion of the inwardly or outwardly curved cam surface, said first and second contactable portions being circumferentially spaced from each other, and wherein the three contact areas between the rotatable body and the recess occur in both the open position and the fixing position.

21. The saw blade of claim 20, wherein the rotatable body rotates in a counterclockwise position between the open position and the fixing position.

22. The saw blade of claim 20, wherein the rotatable body is rotatable from the open position to the fixing position.

* * * * *